United States Patent [19]
Milohanic et al.

[11] Patent Number: 5,664,484
[45] Date of Patent: Sep. 9, 1997

[54] FRYING APPARATUS AND PROCESS

[75] Inventors: Slobodan Milohanic, Aengelholm; Lars Moeller, Bjuv, both of Sweden

[73] Assignee: Nestec S.A., Vevey, Switzerland

[21] Appl. No.: 523,822

[22] Filed: Sep. 6, 1995

[30] Foreign Application Priority Data

Sep. 22, 1994 [SE] Sweden ................... 94114931

[51] Int. Cl.⁶ .................................................. A47J 37/08
[52] U.S. Cl. ........................... 99/404; 99/407; 99/409; 99/423
[58] Field of Search ................... 99/404, 407, 409, 99/423, 443 C

[56] References Cited

U.S. PATENT DOCUMENTS

| | | |
|---|---|---|
| 2,610,033 | 9/1952 | Rietz ................... 99/404 X |
| 2,643,603 | 6/1953 | Balluteen . |
| 3,585,923 | 6/1971 | Walker ................... 99/404 X |
| 3,616,747 | 11/1971 | Lapeyre ................... 99/404 X |
| 3,826,184 | 7/1974 | Shotton, Jr. ................... 99/404 |
| 4,181,072 | 1/1980 | Hirahara ................... 99/404 X |
| 4,228,730 | 10/1980 | Schindler et al. ................... 99/329 R |
| 5,253,567 | 10/1993 | Gunawardena ................... 99/404 |

FOREIGN PATENT DOCUMENTS

| | | |
|---|---|---|
| 493584 | 9/1976 | Australia . |
| 639895 | 7/1950 | United Kingdom . |

*Primary Examiner*—Reginald L. Alexander
*Attorney, Agent, or Firm*—Vogt & O'Donnell, LLP

[57] ABSTRACT

A frying apparatus for conveying food on a surface coated with oil heated for frying the food pieces has a tray which extends longitudinally for containing food pieces for frying, and an assembly is positioned for conveying food pieces in a direction from one end of the tray to the other so that during the conveying, the food pieces are mixed and so that the tray surface upon which the food pieces are fried is scraped for cleaning the surface. In two apparatus embodiments, members of the conveying assembly form a helical arrangement in an area about and are displaced a distance from a circumference of a rotatable shaft and are configured for scraping the tray surface for cleaning the surface, and in another embodiment, plate members which have a shape of a section of an ellipsoid plane are affixed with an axle at an angle with respect to a lateral cross-section of the axle so that upon rotation of the axle in one direction, the plate members convey food pieces. In operation, the time food pieces are fried is controlled, and the food pieces may be conveyed discontinuously for frying.

27 Claims, 4 Drawing Sheets

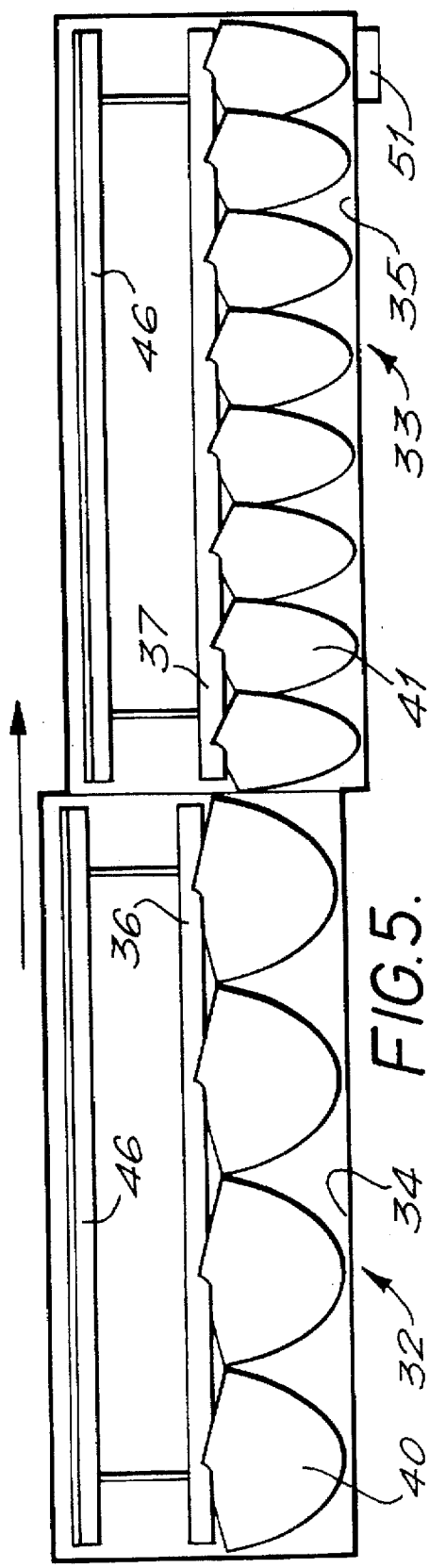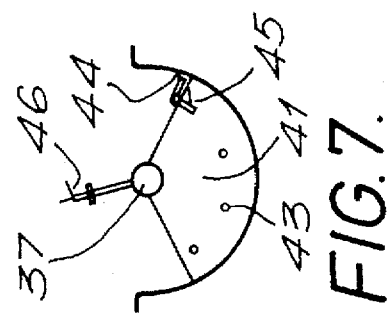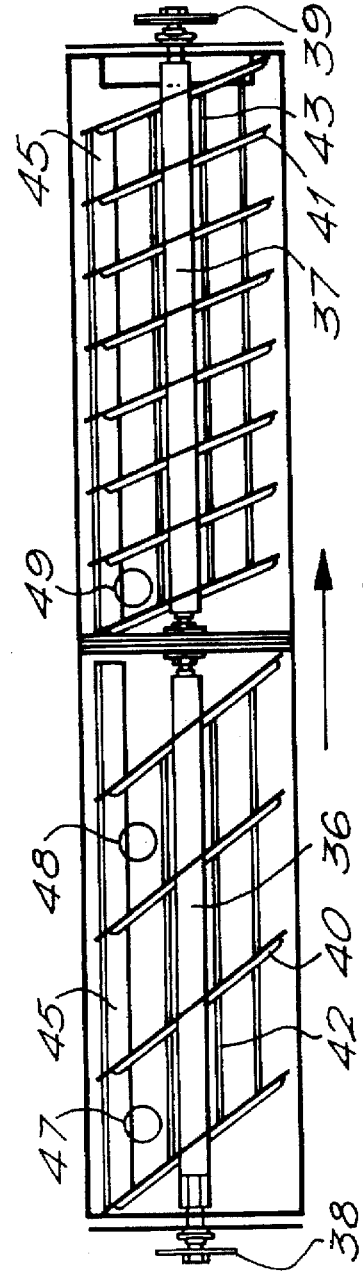

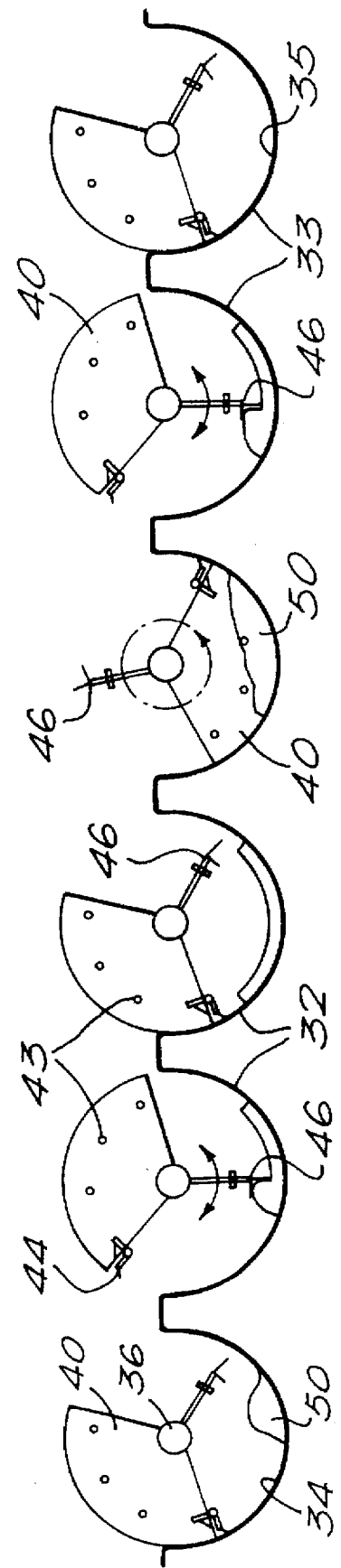

5,664,484

FRYING APPARATUS AND PROCESS

BACKGROUND OF THE INVENTION

The present invention relates to a frying apparatus and process.

The usual frying methods nowadays are deep-fat frying, belt frying (on a TELFLON or steel belt) and drum frying. The frying of spherical pieces or mixtures of different ingredients is mostly effected by deep-fat frying which is not only undesirable from a health point of view, but also imparts an oil-like taste to the product.

The frying of meatballs may be carried out in a drum fryer, but this method suffers from the disadvantage of overheated oil occuring at those parts of the drum not covered by the product. For frying a product consisting of different ingredients which require different frying times, it is difficult to add the new ingredients during the frying and although it is possible to use two or more fryers, this adds to the costs and it is also necessary to provide separate mixers between the fryers.

SUMMARY OF THE INVENTION

We have devised an apparatus for solving the above problems wherein the product may be fried and mixed simultaneously, new ingredients may be added during frying and overheated frying oil is not formed.

According to the present invention there is provided a fryer comprising:
- a tray for containing a frying oil on its surface and a product to be surface fried, means for conveying and mixing the product horizontally from an inlet position to an outlet position and simultaneously cleaning the frying surface of the tray,
- means for heating the frying oil, and means for controlling the period of time during which the product contacts the frying oil in order to obtain a fried surface of the product.

The present invention also provides a process for surface-frying a food product which comprises conveying the food product horizontally from an inlet position to an outlet position in a tray whose surface is coated with frying oil while simultaneously mixing the product and cleaning the frying surface of the tray and controlling the period of time during which the product contacts the frying oil in order to obtain a fried surface of the product.

DETAILED DESCRIPTION OF THE INVENTION

In the apparatus embodiments of the present invention and for carrying out the process of the present invention, the tray may be made of any material suitable for a frying process, e.g. a metal such as steel. It is preferably elongated in shape and may be in the form of a shallow trough, the frying surface of which is concave in cross-section. Preferably, the tray is adapted to remain stationary or substantially stationary during frying of the product.

The means for heating the frying oil may be achieved by the provision of a double wall in the tray through which hot oil flows. The hot oil may be heated either by a heat exchanger connected to steam under pressure, e.g. 20 bars, or directly from an oil burner. Preferably, the double will does not extend above the level of the product within the tray in order to protect the frying oil from overheating on the surface of the tray which would not be covered by the product.

One means for conveying and mixing the product may be, for example, provided by a shaft fitted with angled paddles in a helical arrangement extending from an inlet end to an outlet end within the tray and adapted to rotate so that their edges contact and scrape the frying surface of the tray. The paddles are advantageously slightly curved so that their edges which contact the frying surface of the tray will transport the product and clean the frying surface of the tray by scraping. The rotation of the shaft forces the product from the inlet position to the outlet position and also enables mixing of the product by the action of the paddles. In addition, the scraping action of the edges of the paddles on the frying surface of the tray enables the frying surface to remain clean.

Means for rotating the shaft may be provided by a drive motor attached to one end of the shaft.

The means for controlling the period of time during which the product remains in contact with the frying oil in order to achieve a fried surface of the product may be provided by a discontinuous movement of the rotation of the shaft. The discontinuous movement may be achieved, for instance, by a computer connected to the drive motor and may be adjusted according to the nature of the product to be fried. The discontinuous rotation helps to achieve a fried surface on the product. The speed of the rotation is not critical but may be chosen according to the mixing capacity and/or the fragility of the product and may be, for instance, from 5 to 100 and preferably from 10 to 50 RPM. The duration of each period of discontinuous rotation of the shaft is not critical but is usually from 5 to 60 seconds, e.g. from 10 to 40 seconds. Each period of rotation may be separated by a period of from 10 seconds to 5 minutes, preferably from 30 seconds to 3 minutes during which time the shaft is stationary.

An alternative means for conveying and mixing the product may be provided by a central axle adapted to rotate and extending horizontally from a tray inlet end to an outlet end fitted with a plurality of plates, or wings, projecting substantially perpendicularly from the central axle and positioned at an angle in the perpendicular plane so that on rotation of the axle, the movement of a plate transports the product a certain distance corresponding to the width of the angle. The alternative means may also comprise a scraper to clean the frying surface, a mixing plate to lift and turn the product while rotating and a level-out system, such as an articulated level-out system positioned on the opposite side of the axle to the plates or wings, to maintain a desired thickness of the product layer on the frying surface of the tray. In this embodiment, the tray preferably consists of two double jacketed tubs in two levels, preferably tightly mounted to each other, each tub being separately heated with thermal oil. The downstream tub is preferably at a lower level to the upstream tub. The central axles in each tub are adapted to rotate clockwise and anti-clockwise and are separately driven, e.g. by two computer controlled servomotors. Advantageously, the plates or wings in the downstream tub are mounted at a narrower angle in the perpendicular plane than the plates in the upstream tub and therefore one rotation of the central axle transports the product less distance in the downstream tub than in the upstream tub. This arrangement in the downstream tub therefore requires more turns than the arrangement in the upstream tub to transport the food product a specified distance in the tray, e.g. 1.5 to 2.5 turns and preferably 1.75 to 2.25 turns of the central axle in the downstream tub are required to transport the product the same distance as one turn of the central axle in the upstream tub. The reason why the tray is divided into two parts with the plates in the downstream tub mounted at a narrower angle than those in the upstream tub is because it is necessary that the product lies still on the frying surface of the tray for specified periods during frying in order to achieve an attractive browning. During frying the product becomes hotter and therefore the resting time on the frying surface of the tray should preferably be shorter in order to avoid burned and/or destroyed portions.

The plates are each conveniently segments of an ellipsoid plane section, preferably from 1/5 to 1/2 and more preferably from 2/5 to 4/5 of the ellipsoid plane section.

The plates are preferably connected to one another by means of one or more connecting rods or stay tubes to give stability.

Generally, the frying oil is added to the tray and heated to the frying temperature before the product is added. The amount of frying oil added to the tray depends on the product but may be from 0.5 to 10%, usually from 1 to 6% and more usually from 1.5 to 4% by weight based on the weight of product being fried.

Examples of products which may be fried by the apparatus and process of this invention include meat balls, diced potatoes and products containing a mixture of ingredients such as the Swedish "Pyttipanna" or Chinese types of stir fries. When a product contains a mixture of ingredients which require different frying times, it is easy to add the ingredients which require shorter frying times at the appropriate position between the inlet and outlet positions of the tray.

The process of the present invention may be carried out batchwise or continuously. In both batchwise and continuous processes the product can be added simply by dropping it into the tray. In a batchwise process, the batches may conveniently be weighed manually and added by a semi-automatic device such as a screw feeder. In a continuous process, weighing belts may be used to add the product to the tray.

BRIEF DESCRIPTION OF THE DRAWINGS

The present invention is illustrated further, by way of example only, with reference to the accompanying drawings.

FIG. 5 is a side view of a fryer according to the present invention which illustrates a third embodiment for conveying and mixing food pieces during frying.

FIG. 6 is a plan view of the fryer of FIG. 5.

FIG. 7 is a lateral cross-sectional view of the fryer of FIG. 6.

FIG. 8 is a series of lateral cross-sectional views of the fryer of FIG. 6 which shows a cycle of the means for conveying and mixing food pieces during frying.

DETAILED DESCRIPTION OF THE DRAWINGS AND OPERATIONAL EXAMPLES

Figure 1:
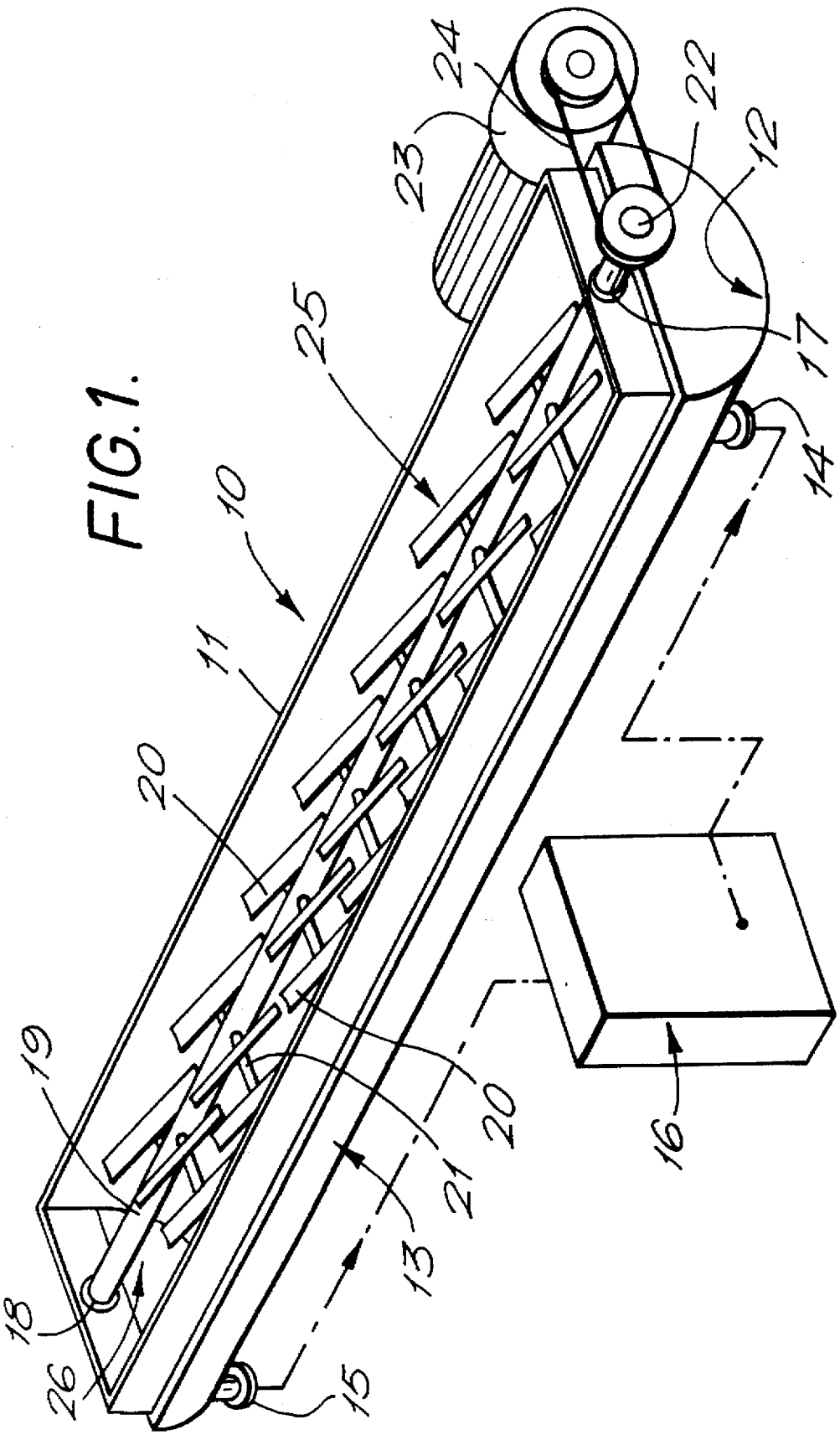
FIG. 1 is a perspective view of a fryer according to the present invention which illustrates one embodiment for conveying and mixing food pieces during frying.

Referring to FIG. 1, the fryer, generally designated 10, comprises an elongated tray 11 having a frying surface 12 which is concave in cross-section and provided with a heating jacket 13, through which flows heating oil via inlet 14 and outlet 15, and a heat exchanger 16 connected to steam at twenty bar pressure. The tray 11 is provided with holes 17, 18 at each end through which passes a shaft 19 adapted to rotate and fitted with angled paddles 20 which are attached in pairs to the shaft 19 at the mid-point of their lengths by means of an rod 21. The outer long edge of each paddle facing the frying surface 12 is curved in a convex manner so that when the shaft rotates, the convex long edge of the paddle 20 corresponds to the concave frying surface 12 and is adapted to contact and scrape the frying surface. One end 22 of the shaft is connected to a drive motor 23 by means of a drive belt 24. The product is fed into the tray at an inlet position 25 and is passed out of the tray at an outlet position 26.

In operation, heating oil is passed through the heating jacket 13, frying oil is placed in the tray to cover the frying surface 12, the drive motor 23 rotates the shaft 19 discontinuously, with rotation at 20 RPM for 10 seconds and with a one or two minutes rest period in between, and meat balls are fed into the tray at the inlet position 25. The rotation of the shaft 19 and the paddles 20 forces the meat balls along the tray from the inlet position 25 to the outlet position 26 while they are mixed and fried by the frying oil and simultaneously, the curved outer long edges of the paddles 20 scrape and clean the frying surface 12. The discontinuous rotation of the shaft is controlled by a computer (not shown) and ensures that the meat balls are fried for the desired length of time before exiting the tray 11 at the outlet position 26.

For frying a mixed product such as the Swedish dish Pyttipanna (a mixture of diced potatoes, meat, onions and spices), the frying oil is first added to the tray and heated to the frying temperature. The potatoes are added and the shaft 19 is rotated at 20 RPM for 10 seconds with a one or two minutes rest period in between. The potatoes are fried for 6 minutes during which time they are transported to a position nearly half way along the tray. At this position, the onions, meat and spices are added and fried together with the potatoes for a further 8 minutes. On reaching the outlet position 26, each ingredient has been fried for the desired length of time.

The frying oil does not become overheated as in a drum fryer and the fryer is more efficient and energy saving than conventional fryers.

Figure 2:
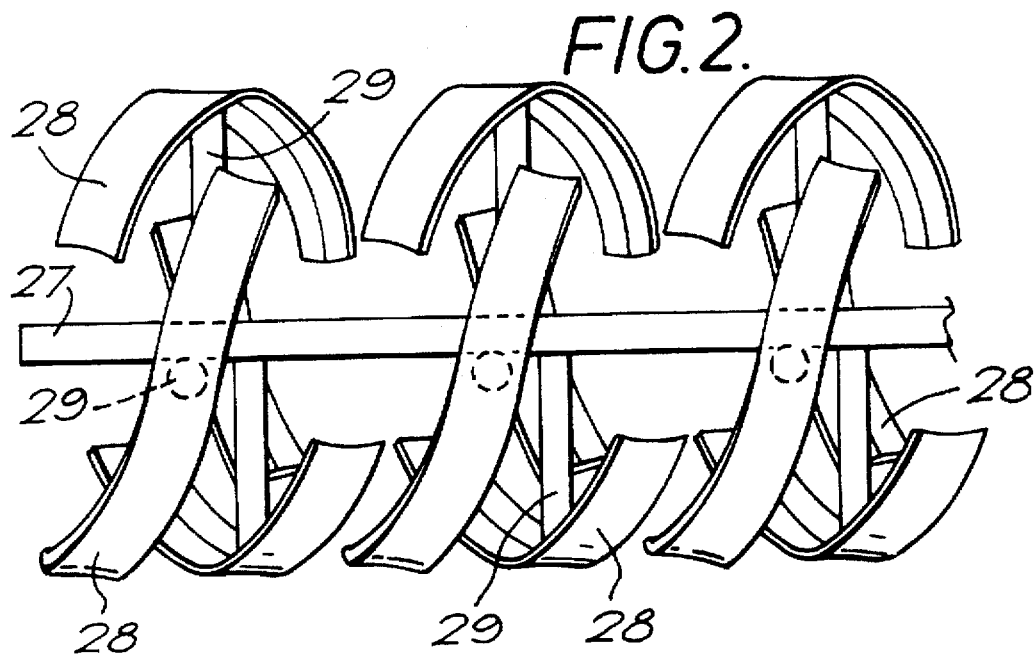
FIG. 2 is a diagrammatic side view of a second embodiment for conveying and mixing a food product during frying.
Figure 3:
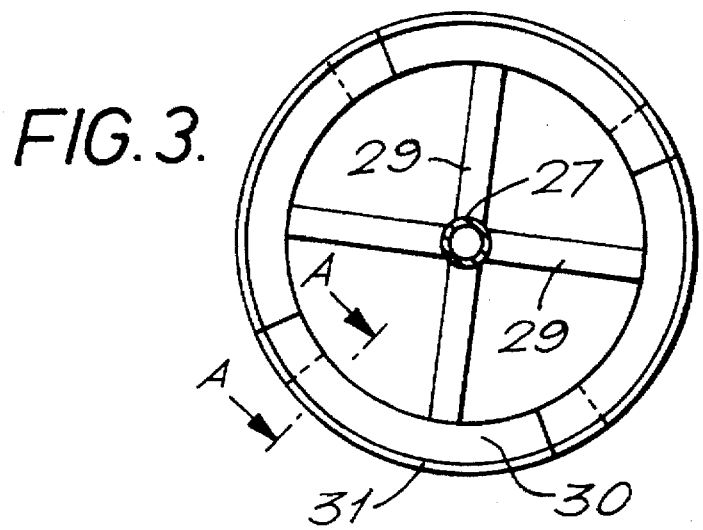
FIG. 3 is a lateral cross-sectional view of the conveying and mixing means of FIG. 2.
Figure 4:
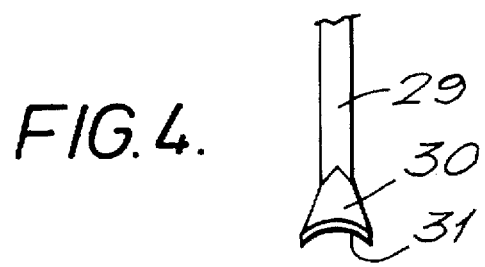
FIG. 4 is a section of FIG. 3 as indicated by line 4—4.

Referring to FIGS. 2, 3 and 4, the shaft 27 adapted to rotate is fitted with curved angled paddles 28 each consisting of an anchor rod 29, an anchor plate 30 and a scraping plate 31. Each paddle is attached to the shaft 27 by means of the anchor shaft 29.

Referring to FIGS. 5 to 8 of the drawings, the fryer comprises two trays 32, 33 each having a frying surface 34, 35 which is concave in cross-section and provided with a heating jacket (not shown) through which flows heating oil via an inlet and an outlet (not shown), and a heat exchanger (also not shown) connected to steam at 20 bar pressure. Each tray is provided with a axle 36, 37 one end of each of which 38, 39 is separately connected to a computer controlled servo-motor (not shown) which is adapted to rotate the axles both clockwise and anti-clockwise.

Mounted on each axle 36, 37 are a plurality of wings (plates) 40, 41 for transportation, each wing being a 1/3 segment of an ellipsoid plane section, each wing projecting transversely from the axle and positioned at an angle to a plane formed by a lateral cross-section of the axle the angle of the wings 40 being wider than that of the wings 41 so that on rotation of the respective axles two turns of axle 37 are required to transport the product the same distance as only one turn of axle 36, The wings 40, 41 are connected to each other by four stay tubes 42, 43 respectively. Each wing is provided with a scraper 44 to clean the frying surface and a mixing plate 45 to lift and turn the product. An articulated level-out system 46 is mounted on each axle on the opposite side to the wings. Dosing points for potatoes, onions and meat are shown at 47, 48, 49, the product is shown at 50 and the final fried product outlet is shown at 51.

In operation, heating oil is passed through the heating jacket, frying oil is placed in each of the trays 32, 33 to cover the frying surfaces 34, 35 and the servo-motors rotate the axles in accordance with the function illustrated in FIG. 8.

The fryer can be divided into sections where each section is the distance between an adjacent pair of wings 40, 41. The product is transported stepwise from section to section by an intermittent rotation of the axles, in the direction of the arrows to the right in the drawings, the distance travelled by the product during one whole turn of the axle (360°) depending on the angle of the wings.

The function shown in FIG. 8 illustrates five steps as follows:

1. Dosing

The bottom of the fryer is "free". The axle 36 is in its zero position

2. Level out

The axle 36 turns clockwise 105° and returns thereafter to zero position to level out the product, the thickness of the product layer 50 being reduced by increasing the length of the articulated level-out system 46.

3. Frying

The product 50 is lying stationary at the bottom of the fryer. Resting time for "pyttipanna" is 120 s in the first part and 60 s in the second part of the fryer.

4. Transport and mixing

The axle 36 turns counter-clockwise 360°, and the wing 40 transports the product one section. The rotation speed is 60° per second, i.e. a complete revolution takes 6 seconds. When rotating counter-clockwise, the level-out system glides over the product and thus does not affect the thickness. Since the plate 40 is mounted at an angle in the perpendicular plane, the product is pushed to the side of the fryer at the same time as it is transported forward.

5. Level out

The axle 36 turns clockwise 105° (this takes slightly less than 2 seconds) and return thereafter to zero position to level out the product by means of the level-out system 46 to maintain a specified thickness of the product layer on the bottom of the fryer.

The whole cycle is repeated.

Points 1–5 can be described as one cycle, total frying time for the product is 12 cycles (four cycles ×128 s in the first part and eight cycles ×68 sec in the second part).

In FIG. 6, in the "Pyttipanna" production, the potatoes are dosed at position 47, the onions are dosed at position 48 and the meat is dosed at position 49. By the end of the process, all ingredients are mixed together.

In order to achieve an attractive browning, it is necessary that the product lies stationary on the frying surface for specified periods during the frying. As the product while frying gets warmer, the resting time by the end of the process needs to be shorter to avoid burned and/or destroyed pieces. This is the reason why the fryer is divided into two parts with different angles on the transport wings. The ratio is 1/2, e.g. 1 turn in the first part is equal to 2 turns in the second.

We claim:

1. An apparatus for frying food pieces comprising:

a tray comprising a concave surface which extends longitudinally from a first tray end to a second tray end for containing food pieces for frying the pieces;

means for conveying food pieces in a direction from the first tray end to the second tray end and mixing the food pieces and for cleaning the tray surface comprising a unitary shaft and paddle member assembly which comprises a rotatable shaft and a plurality of paddle members affixed with the shaft, wherein the shaft extends longitudinally from the first tray end to the second tray end, wherein the paddle members are spaced along a length of the shaft a distance apart one from another and from the shaft so that the paddle members form a helical arrangement in an area about and displaced from a circumference of the shaft and wherein the paddle members have a surface which is positioned at an angle with respect to an axial cross-section of the shaft and which extends for a distance away from the shaft to a paddle member edge so that in the presence of food pieces contained by the tray surface and upon rotation of the assembly about the longitudinal axis of the shaft, the paddle members contact and convey the food pieces in a direction from the first tray end to the second tray end and mix the food pieces and so that the edges scrape the tray surface for cleaning the tray surface;

means for heating the tray surface for frying food pieces contained by the tray surface; and means for rotating the shaft for controlling an amount of time food pieces are contained by the tray surface for controlling a food piece frying time.

2. An apparatus according to claim 1 wherein the assembly further comprises rods which extend transversely from the shaft to the paddle members for affixing the paddle members with the shafts.

3. An apparatus according to claim 1 wherein the paddle members are curved for, upon rotation and contact with food pieces, further conveying the food pieces in the direction from the first tray end to the second tray end.

4. An apparatus according to claim 1 wherein the means for rotating the shaft provides for discontinuous rotation.

5. An apparatus according to claim 1 wherein the tray surface is a surface of a first wall member which comprises a second surface which opposes the tray surface and the means for heating comprises a double wall configuration comprising the first wall member and a second wall member displaced a distance from the first wall member second surface for providing a jacket assembly for passage of a fluid between the wall members for heating the tray surface.

6. An apparatus for frying food pieces comprising:

a tray comprising a concave surface which extends longitudinally from a first tray end to a second tray end for containing food pieces for frying the pieces;

means for conveying food pieces in a direction from the first tray end to the second tray end and mixing the food pieces and for cleaning the tray surface comprising a unitary shaft and paddle member assembly which comprises a rotatable shaft and a plurality of arcuate paddle members affixed with the shaft wherein the shaft extends longitudinally from the first tray end to the second tray end, wherein the paddle members are spaced along a length of the shaft a distance apart one from another and from the shaft so that the paddle members form a helical arrangement in an area about and displaced from a circumference of the shaft and wherein the paddle members are curved so that the paddle members have a surface which faces the shaft and forms a concave shape and which extends a distance to a paddle member edge so that in the presence of food pieces contained by the tray surface and upon rotation of the assembly about the longitudinal axis of the shaft, the paddle members contact and convey the food pieces in a direction from the, first tray end to the second tray end and mix the food pieces and so that the edges scrape the tray surface for cleaning the tray surface;

means for heating the tray surface for frying food pieces contained by the tray surface; and means for rotating the shaft for controlling an amount of time food pieces are contained by the tray surface for controlling a food piece frying time.

7. An apparatus according to claim 6 wherein the assembly further comprises rods which extend transversely from the shaft to the paddle members for affixing the paddle members with the shaft.

8. An apparatus according to claim 7 wherein the paddle members comprise one anchor member affixed to one of the rods and a second member affixed to the anchor member which extends to the edge for scraping.

9. An apparatus according to claim 6 wherein the means for rotating the shaft provides for discontinuous rotation.

10. An apparatus according to claim 6 wherein the tray surface is a surface of a first wall member which comprises a second surface which opposes the tray surface and the means for heating comprises a double wall configuration comprising the first wall member and a second wall member displaced a distance from the first wall member second surface for providing a jacket assembly for passage of a fluid between the wall members for heating the tray surface.

11. An apparatus for frying food pieces comprising:

a tray comprising a concave surface which extends longitudinally from a first tray end to a second tray end for containing food pieces for frying the pieces;

means for conveying food pieces in a direction from the first tray end to the second tray end and mixing the food pieces comprising a unitary axle and plate member assembly which comprises a rotatable axle and a plurality of plate members affixed with the axle wherein the axle extends longitudinally from the first tray end to the second tray end, wherein the plate members have a shape of a section of an ellipsoid plane and wherein the plate members are spaced along the axle a distance apart one from another and have a plane section surface which extends at an angle with respect to a lateral cross-section of the axle for a distance so that in the presence of food pieces contained by the tray surface and upon rotation of the assembly about the longitudinal axis of the axle, the plate members convey the food pieces in a direction from the first tray end to the second tray end and mix the food pieces;

means for heating the tray surface for frying food pieces contained by the tray surface; and means for rotating the axle for controlling an amount of time food pieces are contained by the tray surface for controlling a food piece frying time.

12. An apparatus according to claim 11 further comprising means for cleaning the tray surface which comprises a member which is affixed to and extends from the plates to a position for, upon rotation of the assembly, scraping the tray surface for cleaning the tray surface.

13. An apparatus according to claim 11 further comprising additional means for mixing food pieces which comprises a member which is affixed to and extends from the plate members for, upon rotation of the assembly, lifting and turning food pieces contained by the tray to mix the food pieces.

14. An apparatus according to claim 11 further comprising a system for leveling food pieces which comprises members which extend from the axle transversely to a position displaced from the axle and between the plates for leveling a mass of food pieces contained by the tray surface.

15. An apparatus according to claim 14 wherein the members extend from the axle at a position displaced from a periphery of the plates.

16. An apparatus according to claim 11 further comprising means for cleaning the tray surface and a system for leveling food pieces which comprise a first member which is affixed to and extends from the plates position for, upon rotation of the assembly, scraping the tray surface for cleaning the try surface and which comprise second members which extend from the axle transversely to a position displaced from the axle and between the plates for leveling a mass of food pieces contained by the tray surface.

17. An apparatus according to claim 16 wherein the additional members extend from the axle at a position displaced from a periphery of the plates.

18. An apparatus according to claim 16 further comprising additional means for mixing food pieces which comprises a member which is affixed to and which extends from the plate members for, upon rotation of the assembly, lifting and turning food pieces contained by the tray to mix the food pieces.

19. An apparatus according to claim 18 wherein the second member extend from the axle at a position displaced from a periphery of the plates.

20. An apparatus according to claim 11 wherein the means for rotating the axle provides for discontinuous rotation.

21. An apparatus according to claim 20 wherein the means for rotating the axle further provides for rotation and counter-rotation.

22. An apparatus according to claim 18 wherein the means for rotating the axle provides for discontinuous rotation.

23. An apparatus according to claim 22 wherein the means for rotating the axle provides for rotation and counter-rotation.

24. An apparatus according to claim 11 wherein the tray surface is a surface of a first wall member which comprises a second surface which opposes the tray surface and the means for heating comprises a double wall configuration comprising the first wall member and a second wall member displaced a distance from the first wall member second surface for providing a jacket assembly for passage of a fluid between the wall members for heating the tray surface.

25. An apparatus according to claim 11 wherein the plates are ⅕ to ½ segments of an ellipsoid plane.

26. An apparatus according to claim 11 wherein the tray is a first tray and the plate members are first plate members and further comprising:

a further tray comprising a concave surface which extends longitudinally from a further tray first end to a further tray second end for containing food pieces for frying the pieces wherein the first tray and the further tray are positioned end-to-end so that the further tray first end receives food pieces via the first tray second end;

further means for conveying food pieces in a direction from the further tray first end to the further tray second end and mixing the food pieces comprising a further unitary axle and plate member assembly which comprises a plurality of plate members affixed with a rotatable axle wherein the further assembly axle extends longitudinally from the further tray first end to the further tray second end, wherein the further assembly plate members have a shape of a section of an ellipsoid plane and wherein the further assembly plate members are spaced along the further assembly axle a distance apart one from another and have a plane section surface which extends at an angle with respect to a lateral cross-section of the further assembly axle for a distance so that in the presence of food pieces contained by the further tray surface and upon rotation of the assembly about the longitudinal axis of the further assembly axle, the plate members convey the food pieces in a direction from the further tray first end to the further tray second end and mix the food pieces and so that the further assembly plate members extend from the further assembly axle at an angle different from the angle of the first plate members;

further means for heating the further tray surface for frying food pieces contained by the further tray surface; and further means for rotating the further assembly axle for controlling an amount of time food pieces are contained by the further tray surface for controlling a food piece frying time.

27. An apparatus according claim 26 wherein the second assembly plate members extend from the second axle at an angle different from the angle of the first plate members so that per plate, rotation of the second assembly transports food product pieces less distance than rotation of the first assembly.

* * * * *

UNITED STATES PATENT AND TRADEMARK OFFICE
CERTIFICATE OF CORRECTION

PATENT NO. : 5,664,484
DATED : September 9, 1997
INVENTOR(S) : Slobodan MILOHANIC, et al.

It is certified that error appears in the above-indentified patent and that said Letters Patent is hereby corrected as shown below:

On the title page, under the heading "Foreign Application Priority Data", delete "[SE] Sweden" and insert therefor -- [EP] European Pat. Off.--.

Signed and Sealed this

Twelfth Day of January, 1999

Attest:

Attesting Officer

*Acting Commissioner of Patents and Trademarks*